United States Patent
Tormasov et al.

(10) Patent No.: US 11,632,310 B2
(45) Date of Patent: Apr. 18, 2023

(54) SYSTEMS AND METHODS FOR PATTERN-BASED QUALITY OF SERVICE (QOS) VIOLATION PREDICTION

(71) Applicant: Acronis International GmbH, Schaffhausen (CH)

(72) Inventors: Alexander Tormasov, Moscow (RU); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/120,597

(22) Filed: Dec. 14, 2020

(65) Prior Publication Data

US 2021/0258230 A1     Aug. 19, 2021

Related U.S. Application Data

(60) Provisional application No. 62/975,803, filed on Feb. 13, 2020.

(51) Int. Cl.
*H04L 41/5009*     (2022.01)
*H04L 41/5006*     (2022.01)
(Continued)

(52) U.S. Cl.
CPC .......... *H04L 41/5016* (2013.01); *H04L 41/16* (2013.01); *H04L 41/5006* (2013.01); *H04L 41/5019* (2013.01); *H04L 43/0805* (2013.01)

(58) Field of Classification Search
CPC ............... H04L 2209/38; H04L 9/3239; H04L 2209/56; H04L 9/0637; H04L 67/10; H04L 41/12; H04L 67/12; H04L 41/0816; H04L 41/5009; H04L 67/16; H04L 41/16; H04L 41/0806; H04L 41/0893; H04L 43/08; H04L 67/02; H04L 41/0803; H04L 41/5025; H04L 63/20; H04L 67/1002; H04L 67/2809; H04L 69/22; H04L 41/08; H04L 41/0823; H04L 41/147; H04L 41/5048; H04L 43/16; H04L 67/104;
(Continued)

(56) References Cited

U.S. PATENT DOCUMENTS

10,511,690 B1 * 12/2019 Chatterjee ............... H04L 67/02
2018/0352025 A1 * 12/2018 Anya ...................... H04L 41/147
(Continued)

*Primary Examiner* — Djenane M Bayard
(74) *Attorney, Agent, or Firm* — ArentFox Schiff LLP; Michael Fainberg (57) ABSTRACT

Disclosed herein are systems and methods for pattern-based QoS violation prediction. In one exemplary aspect, a method may comprise identifying a service on a computing device that is connected to a plurality of client devices and determining a plurality of micro-services comprised in the identified service. The method may comprise parsing access information to detect that a first client device is accessing a micro-service. The method may comprise determining, for a first period of time, QoS evaluation parameters for the access between the micro-service and the first client device. The method may comprise identifying changes in the QoS evaluation parameters within the first period of time, detecting a predetermined QoS violation pattern, and executing a QoS action based on the predetermined QoS violation pattern.

18 Claims, 4 Drawing Sheets

(51) Int. Cl.
*H04L 41/16* (2022.01)
*H04L 43/0805* (2022.01)
*H04L 41/5019* (2022.01)

(58) Field of Classification Search
CPC ... H04L 67/1097; H04L 67/322; H04L 67/42; H04L 69/18; H04L 12/00; H04L 12/14; H04L 41/14; H04L 41/142; H04L 41/5003; H04L 41/5019; H04L 41/5054; H04L 43/045; H04L 43/0817; H04L 45/20; H04L 47/2491; H04L 61/1505; H04L 61/2069; H04L 63/101; H04L 63/1408; H04L 67/1046; H04L 67/1093; H04L 67/125; H04L 67/28; H04L 67/2814; H04L 9/0825; H04L 41/5029; H04L 47/14; H04L 41/0896; H04L 47/19; H04L 47/822; H04L 63/10; H04L 47/20; H04L 63/08; H04L 12/1492; H04L 12/1496; H04L 41/5006; H04L 41/5022; H04L 41/5051; H04L 43/0882; H04L 47/12; H04L 47/2425; H04L 47/2475; H04L 47/801; H04L 47/803; H04L 47/805; H04L 47/808; H04L 47/824; H04L 63/0227; H04L 63/102; H04L 12/1485; H04L 43/0876; H04L 65/607; H04L 43/062; H04L 43/0888; H04L 47/806; H04L 65/601; H04L 67/2804; H04L 67/34; H04L 67/36; H04L 1/0003; H04L 1/0009; H04L 1/0014; H04L 63/0876; H04L 45/22; H04L 45/70; H04L 65/4084; H04L 65/605; H04L 65/80; H04L 69/163; H04L 12/1407; H04L 1/00; H04L 1/0001; H04L 1/0015; H04L 9/50; H04L 67/52; H04L 67/562; H04L 67/566; H04L 67/62; H04L 9/0819; H04L 9/3213; H04L 9/3231; H04L 9/3236; H04L 41/0813; H04L 41/0894; H04L 41/24; H04L 43/04; H04L 63/0414; H04L 63/0421; H04L 67/01; H04L 67/63; H04L 41/0886; H04L 41/5016; H04L 43/0805; H04L 67/60; H04L 41/149; H04L 43/091; H04L 5/0057; H04L 67/1008; H04L 67/1065; H04L 67/51; H04L 67/5682; H04L 67/61

See application file for complete search history.

(56) References Cited

U.S. PATENT DOCUMENTS

| | | | |
|---|---|---|---|
| 2019/0215239 A1* | 7/2019 | Li | G06F 8/71 |
| 2020/0162578 A1* | 5/2020 | Appajanna | H04L 67/32 |
| 2021/0042180 A1* | 2/2021 | Sutton | G06F 16/217 |

* cited by examiner

SYSTEMS AND METHODS FOR PATTERN-BASED QUALITY OF SERVICE (QOS) VIOLATION PREDICTION

CROSS-REFERENCE TO RELATED APPLICATIONS

This application claims the benefit of U.S. Provisional Application No. 62/975,803, filed Feb. 13, 2020, which is herein incorporated by reference.

FIELD OF TECHNOLOGY

The present disclosure relates to the field of data storage, and, more specifically, to systems and methods for pattern-based Quality of Service (QoS) violation prediction.

BACKGROUND

Almost all modern digital, computer, and communication services rely on the principles of Quality of Service (QoS). QoS refers to a set of quantitative indicators and characteristics, which are necessary in order to provide a user with a certain quality of access to a service. For example, for streaming video, video broadcasting, audio conferencing, or VoIP telephony, a QoS threshold can refer to a minimum data transfer rate over communication channels, a maximum number of data transmission delays, a maximum number of lost data packets, or any combination thereof. The goal of any service (e.g., a storage service) is to provide a user with the appropriate level of QoS, and eliminate or prevent any potential QoS violations over time.

Because many data transfer protocols support QoS, certain specific tasks and operations can be prioritized within a system based on data traffic. For example, 20% of data traffic for a system can be allocated to a specific task such as backup or video/audio/game broadcasting. However, allocation alone cannot completely prevent QoS violations as violations may occur because of hardware files, software crashes, malware attacks, unplanned increase in load (e.g., a dramatic increase in the number of new customers for a service, storage, etc.), and even natural disasters.

SUMMARY

To address these shortcomings, aspects of the disclosure describe methods and systems for pattern-based QoS violation prediction. In one exemplary aspect, a method may comprise identifying a service on a computing device that is connected to a plurality of client devices and determining a plurality of micro-services comprised in the identified service. The method may comprise continuously collecting access information for each micro-service of the plurality of micro-services and parsing the access information to detect that a first client device is accessing a micro-service of the plurality of micro-services. The method may comprise determining, for a first period of time, QoS evaluation parameters for the access between the micro-service and the first client device based on the parsed access information. The method may comprise identifying changes in the QoS evaluation parameters within the first period of time. The method may comprise classifying, using a machine learning algorithm, the changes to a predetermined QoS violation pattern, wherein the predetermined QoS violation pattern is associated with a time length until a QoS violation is expected to occur. In response to determining that the time length is within an upcoming second period of time, the method may comprise executing a QoS action that increases the time length until the QoS violation is expected to occur for the access.

In some aspects, executing the QoS action further comprises identifying a key parameter that will cause the QoS violation, searching for the key parameter in a QoS actions database, and executing the QoS action that corresponds to the key parameter in the QoS actions database.

In some aspects, the key parameter is an increase in an amount of client devices accessing the micro-service at a same time, wherein the amount of client devices exceeds a threshold amount of allowable client device, and wherein the QoS action is to schedule access to the micro-service such that the client devices can complete access within a third period of time.

In some aspects, the key parameter is an upcoming system reboot of the computing device during which the micro-service will be unavailable, and the QoS action is to postpone the system reboot and prevent access to the micro-service by other client devices until the system reboot occurs.

In some aspects, the key parameter is an expected network disconnection or hardware failure, and the QoS action is to move the service to a different computing device.

In some aspects, the second period of time is an expected amount of time until the access between the micro-service and the first client device will manually end.

In some aspects, the micro-service is one of: (1) a write operation, (2) a read operation, (3) an operation to service a queue, (4) a metadata service, (5) a replication service, (6) a data recovery service, (7) a device health tracking service, and (8) a behavior analyzing service for storage nodes in a cluster system.

In some aspects, the method may comprise identifying the QoS action, wherein the QoS action is linked with the predetermined QoS violation pattern.

In some aspects, the QoS action is at least one of: (1) replacing a hardware/disk drive, (2) adding additional storage space, (3) increasing channel speed, (4) creating additional backup replica of data, (5) moving data to another storage node, (6) re-scheduling backup operations, and (7) balancing a load on storage and server.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for pattern-based QoS violation prediction. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In order to prevent a QoS violation, the QoS violation must anticipated (before its occurrence). On a technical level, predicting when a QoS violation will occur is probability-based. Conventional methods monitor a connection in order to detect whether a QoS violation has occurred. Unfortunately, by the time a QoS violation has occurred, the service being accessed by a user may have already crashed or may be abandoned by the user due to poor performance.

It should be noted that for a given session, whether a QoS violation will occur may only be of interest to the user until he/she has finished accessing a service. For example, in the field of data storage, a user may just need to copy a certain file from a client device to a storage server. During the time the certain file is being copied, the user may be concerned with QoS. After the file has been copied, however, QoS is not relevant to the user. Therefore, predicting the QoS violation may be more directly associated with determining a likelihood of the QoS violation occurring during an access time of a service. This likelihood can be determined based on historic patterns of usage by the user.

Figure 1:
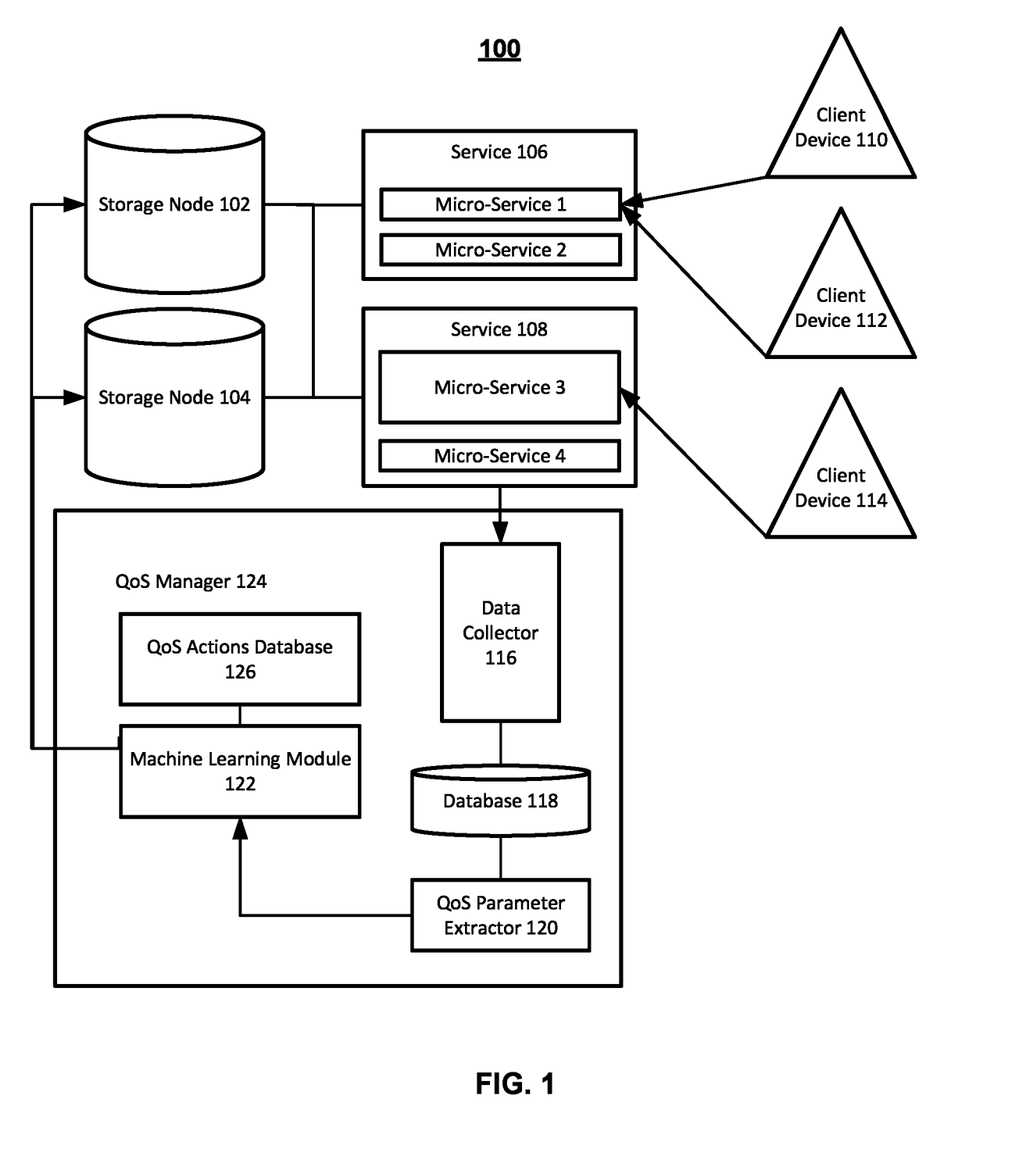
FIG. 1 is a block diagram illustrating a system for pattern-based QoS violation prediction, in accordance with aspects of the present disclosure.

FIG. 1 is a block diagram illustrating system 100 for pattern-based QoS violation prediction, in accordance with aspects of the present disclosure. System 100 comprises storage node 102 and storage node 104. Only two storage nodes are depicted for simplicity, but one skilled in the art would appreciate that several storage nodes may be comprised in system 100. The respective storage nodes may be connected to each other via a wireless network (e.g., a local area network, the Internet, etc.) or by physical wire(s). The storage nodes may be computing devices such as a servers that host services. Such services may include service 106 and service 108. Client devices 110, 112, and 114 may access services 106 and/or 108 on storages nodes 102 and/or 104. Only two services are depicted for simplicity, but one skilled in the art would appreciate that each of the storage nodes may host a plurality of services.

Each service comprises at least one micro-service (e.g., micro-services 1, 2, 3, and 4). Only two micro-services are depicted in each service for simplicity, but one skilled in the art would appreciate that each service may comprise a plurality of micro-services. Service 106 may be a data storage and management service, while service 108 may be a data security service. Micro-service 2 may be a read operation and micro-service 1 may be a write operation. Micro-service 3 may be an encryption operation and micro-service 4 may be a decryption operation. Each of the services may also interact with one another. For example, client device 110 may attempt to upload a file to storage node 104. Storage node 104 may execute (1) micro-service 1 to read the file from client device 110, (2) micro-service 2 to write the file to the memory of storage node 104, (3) micro-service 3 to encrypt the written file, and (4) micro-service 4 to subsequently decrypt the encrypted written file when client device 110 attempts to access it.

QoS manager 124 may be a module that monitors the access activity between the respective client devices and the services on the storage nodes, evaluates whether a QoS violation is expected to happen, and takes action to prevent the QoS violation. QoS manager 124 may comprise data collector 116, which collects raw access information, QoS parameter extractor 120, which parses the access information, and machine learning module 122, which predicts if and when a QoS violation is expected to occur.

Suppose that client device 110 is accessing micro-service 1 of service 106 on storage node 104. Referring to the overarching example, service 106 may be a data storage and management service and micro-service 1 may be a write operation. Rather than assessing the QoS of service 106 as a whole, QoS manager 124 may assess the respective QoS of micro-service 1. Specifically, data collector 116 may monitor all micro-services and generate access information. Access information comprises raw data associated with the usage of the micro-services. For example, the access information may include timestamps, details on when the access began, the network connection details between each client device and storage node, processing states of the respective nodes and devices (e.g., idle, off, active, etc.), memory utilization, etc. Data collector 116 may store this information in database 118.

QoS manager 124 may store a list of QoS violations and their associated micro-services. At least one QoS violation may be linked to a given micro-service. In terms of the writing operation, a QoS violation may occur if the writing rate for the write operation is less than a minimum write rate. For example, client device 110 may wish to upload a file to storage node 104. The size of the file may be 100 MB. The initial writing rate for the file may start as 0.5 MB/s. The minimum write rate may be 0.1 MB/s. If going at the pace of the minimum write rate, the file should be written in 1000 seconds. If going by the initial writing rate, the file will be written in 200 seconds.

QoS parameter extractor 120 may parse the access information collected by data collector 116 and determine QoS evaluation parameters, which comprise changes during a period of time. For example, QoS parameter extractor 120 may monitor the writing operation of client device 110 for 20 seconds and determine that the writing rate is decreasing steadily from 0.5 MB/s to 0.1 MB/s. For the 20 second interval, the QoS evaluation parameters include, for example, the 0.4 MB/s decrease, the remaining file size to be written, the processing powers and memory utilizations of storage node 104 and the client device 110, the network connection changes, and any new access attempt by a different client device (e.g., device 112) to micro-service 1.

QoS parameter extractor 120 then sends QoS evaluation parameters to machine learning module 122, which may be a machine learning algorithm or a neural network that takes the parameters extracted by QoS parameter extractor 120 as an input and classifies the set of parameters. QoS parameter extractor 120 may also store QoS evaluation parameters in another portion of database 118. Machine learning module 122 may be trained using the data stored in that portion of database 118. The training data may include a set of QoS parameters, an identifier of the micro-service, and whether a QoS violation was a result of the parameters and/or when the QoS violation occurred. For example, a training vector may be <QoS parameter 1, parameter 2, parameter 3, parameter 4, micro-service 1, 30 s>, which represents that parameters 1-4 are indicative of a QoS violation that occurred 30 seconds after the latest set of parameters were extracted in micro-service 1. Accordingly, in response to receiving a set of parameters, machine learning module 122 may output whether a QoS violation will occur and/or when. For example, if the decrease in writing rate is drastic, the machine learning module 122 may determine that the QoS violation will in fact occur and will occur within 30 seconds.

QoS manager 124 may receive the output of machine learning module 122 and take an appropriate QoS action to prevent the QoS violation or delay it. For example, if the decreasing writing rate may be inevitable because of the additional client device(s) accessing the same micro-service on a given storage node. Knowing that at the minimum write rate that satisfies QoS the file from client device 110 will be written in 1000 seconds, QoS manager 124 may attempt to extend the time length of when the QoS violation will occur from 30 seconds to 1001 seconds. QoS manager 124 may do this by executing an action such as scheduling client device 112 to access the micro-service 1 via storage node 102 (e.g., balance the loads across the storage nodes) at a later time. For example, storage node 104 may not have enough resources if client device 112 begins writing operations. In addition, scheduling (e.g., postponing some routine operations) can prevent temporary slowdown of micro-services, which will increase QoS for other micro-services (e.g., if client device 112 was accessing micro-service 2 on storage node 104).

In some aspects, QoS actions may also include (1) replacing a hardware/disk drive, (2) adding additional storage space, (3) increasing channel speed, (4) creating additional backup replica of data, (5) moving data to another storage node, (6) re-scheduling backup operations, and (7) balancing a load on storage and server. Of course the course of action to take depends on the type of micro-service and the QoS violation. QoS manager 124 may accordingly manage a data structure that indicates which actions to take in order to prevent specific QoS violations.

It should be noted that QoS parameter extractor 120 may periodically retrieve data from database 118 to extract parameters. Accordingly, in some cases, a micro-service may be accessed without any QoS issues (i.e., normal operation). In some aspects, machine learning module 122 may provide a temporal output of the amount of time remaining before the next QoS violation will occur. If no QoS violation is anticipated, this output may be a very large number. From a high level, machine learning module 122 is comparing the extracted parameters to known historic parameters stored in database 118 to determine when the next violation will occur (if any). From a technical perspective, machine learning module 122 may learn weights that are applied to input parameters to provide an output time. For example, machine learning module 122 may determine the dot product between a weight vector and an input vector comprising the extracted QoS parameters. The dot product may be a time value representing the amount of time remaining after the detection of such parameters until a QoS violation occurs. QoS manager 124 may then determine whether this time is within a period of time of when the micro-service will be accessed. For example, if the micro-service will be accessed for 5 minutes and the QoS violation is expected to occur in 10 minutes should the extracted parameters be maintained, QoS manager 124 will not execute a QoS action.

In order to execute an appropriate QoS action, QoS manager 124 may attempt to determine a cause and resolution. More specifically, in some aspects, QoS manager 124 may identify a key parameter that will cause the QoS violation. For example, in the case of uploading a file, the network connection may be too slow. This may be caused by the fact that, for example, there are too many client devices accessing a particular service (or even a particular micro-service) at the same storage node. In another example, the speed at which files are being encrypted is slower than a minimum QoS speed. This may be caused because there are multiple other micro-services or services being run at the same storage node. Thus, key parameters are indicative of the load that a particular storage node is facing or the popularity of a service/micro-service.

QoS manager 124 may determine that a QoS violation will occur in a certain period of time and attempt to prevent the violation by finding the key parameter that needs to be resolved. QoS manager 124 may refer to QoS actions database 126, which may map parameters to actions, to search for the key parameter in a QoS actions database. QoS manager 124 may then execute the QoS action that corresponds to the key parameter in the QoS actions database.

It should be noted that even after executing the QoS action, because changes occur in real-time, the QoS parameters may indicate that despite the QoS action being executed, a QoS violation will occur. QoS manager 124 may keep a record of QoS actions already implemented for a particular usage session of a micro-service, and subsequently execute a different QoS action in a second attempt to prevent the QoS violation. The execution of multiple QoS actions may occur until the QoS violation is prevented.

In some aspects, QoS actions database 126 may be organized as such:

| KEY PARAMETER | QOS ACTION |
| --- | --- |
| Amount of client devices (N) using micro-service is greater than threshold amount ($N_T$) | Schedule client device (N – $N_T$) for a later time such that access completion for all N client devices is within time T3 |
| Upcoming Node Reboot | Postpone Node Reboot until access of micro-service is complete; prevent access by new nodes until reboot |
| ... | ... |
| Network Disconnection (connectivity speed less than threshold connectivity speed at node) | Shift access to another node that offers micro-service |

As can be seen, a key parameter may be an increase in an amount of client devices accessing the micro-service at a same time, wherein the amount of client devices exceeds a threshold amount of allowable client device. For example, 50 client devices may be accessing an upload task to the same storage node, when the threshold amount that the storage node may sustain is 45. Here, the QoS action may be to schedule access to the micro-service such that the client devices can complete access within a third period of time. In other words, because all 50 client devices may slow down the uploading micro-service such that the last device of the 50 will complete its uploading after 1 hour, QoS manager 124 may schedule the final 5 client devices (that joined after the threshold 45) at a later time. Thus, the uploads of the first 45 client devices may be completed in 45 minutes, the last 5 client devices may begin uploading around the 30 minute mark, and due to the increased bandwidth, may complete their uploads within 50 minutes.

In another example, the key parameter is an upcoming system reboot of the computing device during which the micro-service will be unavailable, and the QoS action is to postpone the system reboot and prevent access to the micro-service by other client devices until the system reboot occurs.

In another example, the key parameter is an expected network disconnection or hardware failure, and wherein the QoS action is to move the service to a different computing device (e.g., from storage node 102 to node 104).

Figure 2:
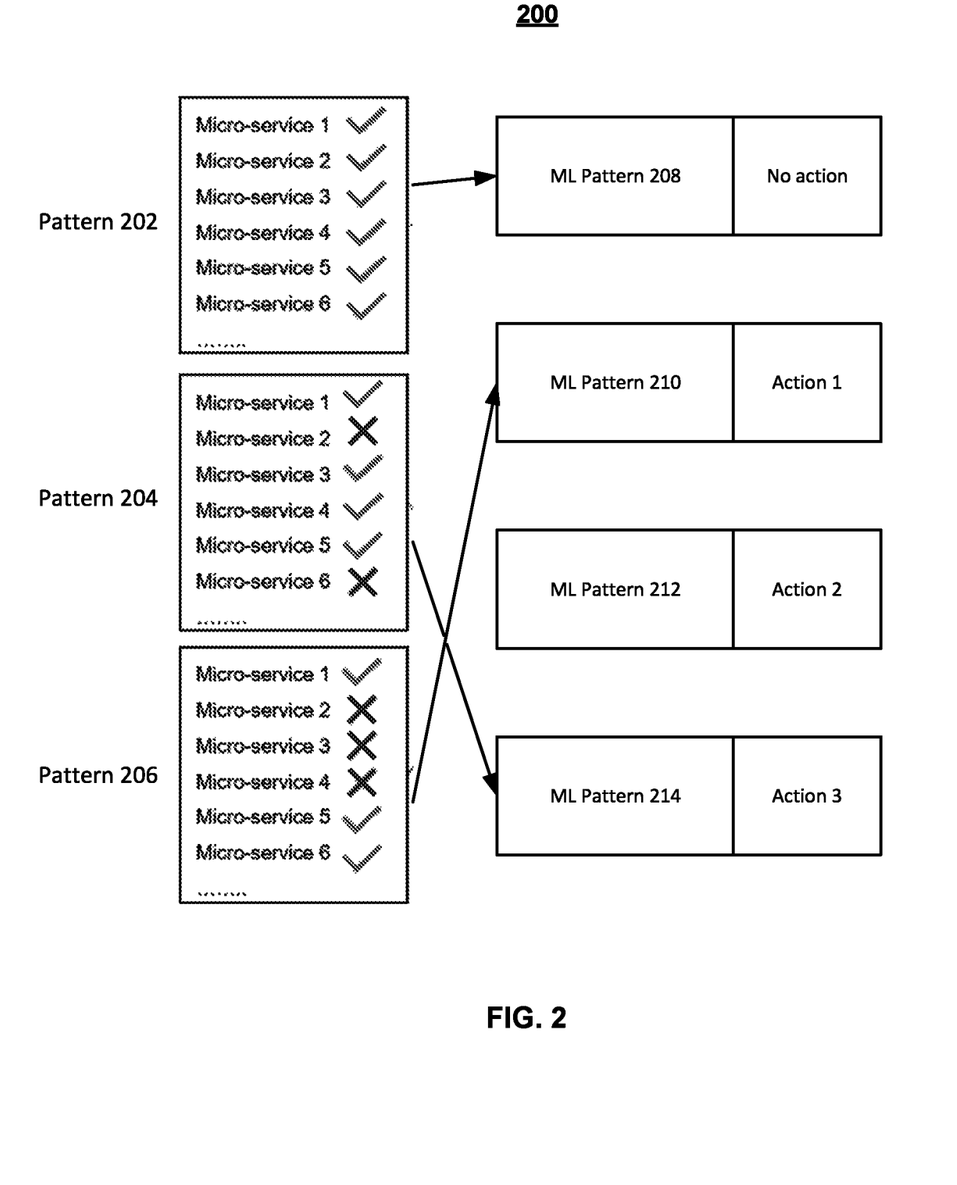
FIG. 2 is a block diagram illustrating a system of matching micro-service status with machine learning patterns, in accordance with aspects of the present disclosure.

FIG. 2 is a block diagram illustrating system 200 of matching micro-service status with machine learning patterns, in accordance with aspects of the present disclosure. In some aspects, QoS manager 124 may consider a service as a whole instead of determining whether a specific micro-service within the service will fail and when. For example, QoS manager 124 may determine the likelihood of each micro-service in a given service experiencing a QoS violation within a given period of time using machine learning module 122. This may be accomplished by determining when each micro-service is expected to experience a QoS violation and further determining whether the time is within the given period of time. If the time is within the given period of time, the micro-service is likely to fail.

Based on the various micro-services facing or not facing QoS violations, QoS manager 124 may execute an appropriate global QoS action. This global QoS action is applied to the entire service, rather than a specific micro-service. Previously, if a micro-service was expected to experience a QoS violation (e.g., a failure to upload a file within a period of time because multiple client devices were accessing the micro-service) QoS manager 124 may perform the QoS action specific to the micro-service (e.g., throttling upload speeds across all client devices). However, the service may be expected to experience other QoS violations due to causes such as hardware failure, a scheduled reboot of a storage node, malware infiltration, execution of multiple services simultaneously, etc. Simply executing a specific QoS action to fix one micro-service may not resolve the issues. Accordingly, a global QoS action such as halting a different service for a brief period of time, moving the service to a different node, scheduling a malware scan of the service, etc., may be implemented by QoS manager 124.

In this context, a pattern does not simply refer to QoS parameter changes associated with one micro-service. Instead, patterns 202-214 each represent a global pattern of how service is being utilized by all client devices and nodes—specifically based on which micro-services are expected to experience QoS violations within an upcoming time period. Referring to system 200, pattern 202 is associated with a service comprising micro-services that will not experience QoS violations. The pattern matches a machine learning (ML) pattern 208, which is linked to QoS action of taking no global action. Pattern 204 is associated with the service when two of the micro-services are expected to experience QoS violations. The ML pattern 214 matches this pattern 204 (i.e., in ML pattern 214, micro-services 2 and micro-service 6 may be anticipated to fail within a certain period of time), and thus QoS manager 124 executes global action 3 to prevent the QoS violations. Lastly, pattern 206, which features three micro-services that are expected to experience QoS violations, is matched with ML pattern 210, and QoS manager 124 executes global action 1. ML pattern 212 is not matched to any of the patterns, which is why global action 2 is not executed.

Figure 3:
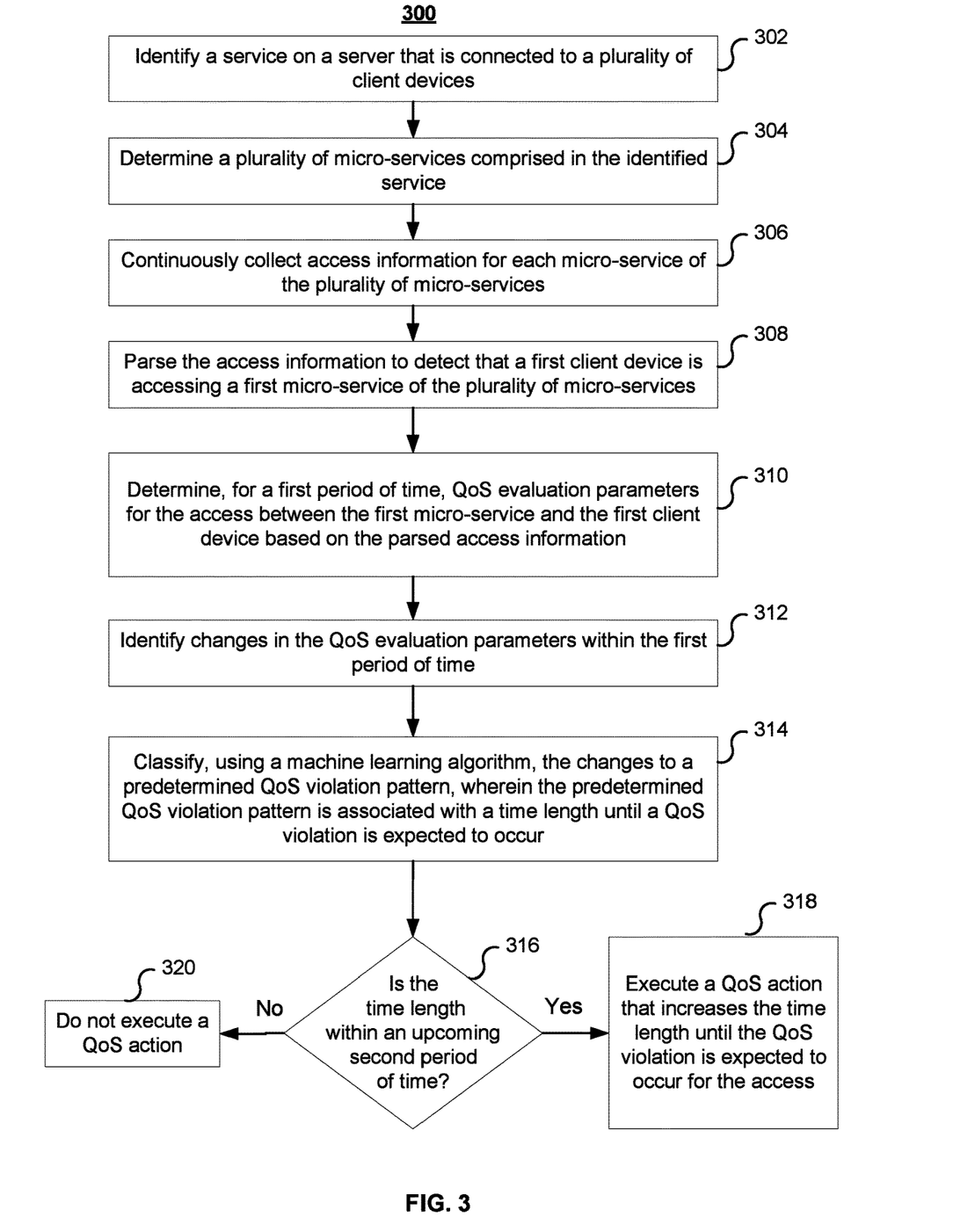
FIG. 3 illustrates a flow diagram of a method for pattern-based QoS violation prediction, in accordance with aspects of the present disclosure.

FIG. 3 illustrates a flow diagram of method 300 for pattern-based QoS violation prediction, in accordance with aspects of the present disclosure. At 302, QoS manager 124 identifies a service (e.g., service 106) on a computing device (e.g., storage node 102) that is connected to a plurality of client devices (e.g., client devices 110, 112, 114). At 304, QoS manager 124 determines a plurality of micro-services (e.g., micro-service 1, 2) comprised in the identified service. At 306, data collector 116 continuously collects access information for each micro-service of the plurality of micro-services.

At 308, data collector 116 parses the access information to detect that a first client device (e.g., client device 110) is accessing a micro-service (e.g., micro-service 1) of the plurality of micro-services. At 310, QoS parameter extractor 120 determines, for a first period of time (e.g., a 15-minute interval), QoS evaluation parameters for the access between the micro-service and the first client device based on the parsed access information. At 312, QoS parameter extractor 120 identifies changes in the QoS evaluation parameters within the first period of time (e.g., a drastic increase in bandwidth consumption).

At 314, QoS manager 124 classifies, using machine learning module 122, the changes to a predetermined QoS violation pattern, wherein the predetermined QoS violation pattern is associated with a time length (e.g., 5 minutes) until a QoS violation (e.g., dropped packets) is expected to occur. At 316, QoS manager 124 determines whether time length is within an upcoming second period of time (e.g., 10 minutes).

In response to determining that the time length is within the upcoming second period of time, at 318, QoS manager 124 executes a QoS action that increases the time length until the QoS violation is expected to occur for the access. In response to determining that the time length is not within the upcoming second period of time, method 300 ends at 320, where QoS manager 124 does not execute the QoS action.

Figure 4:
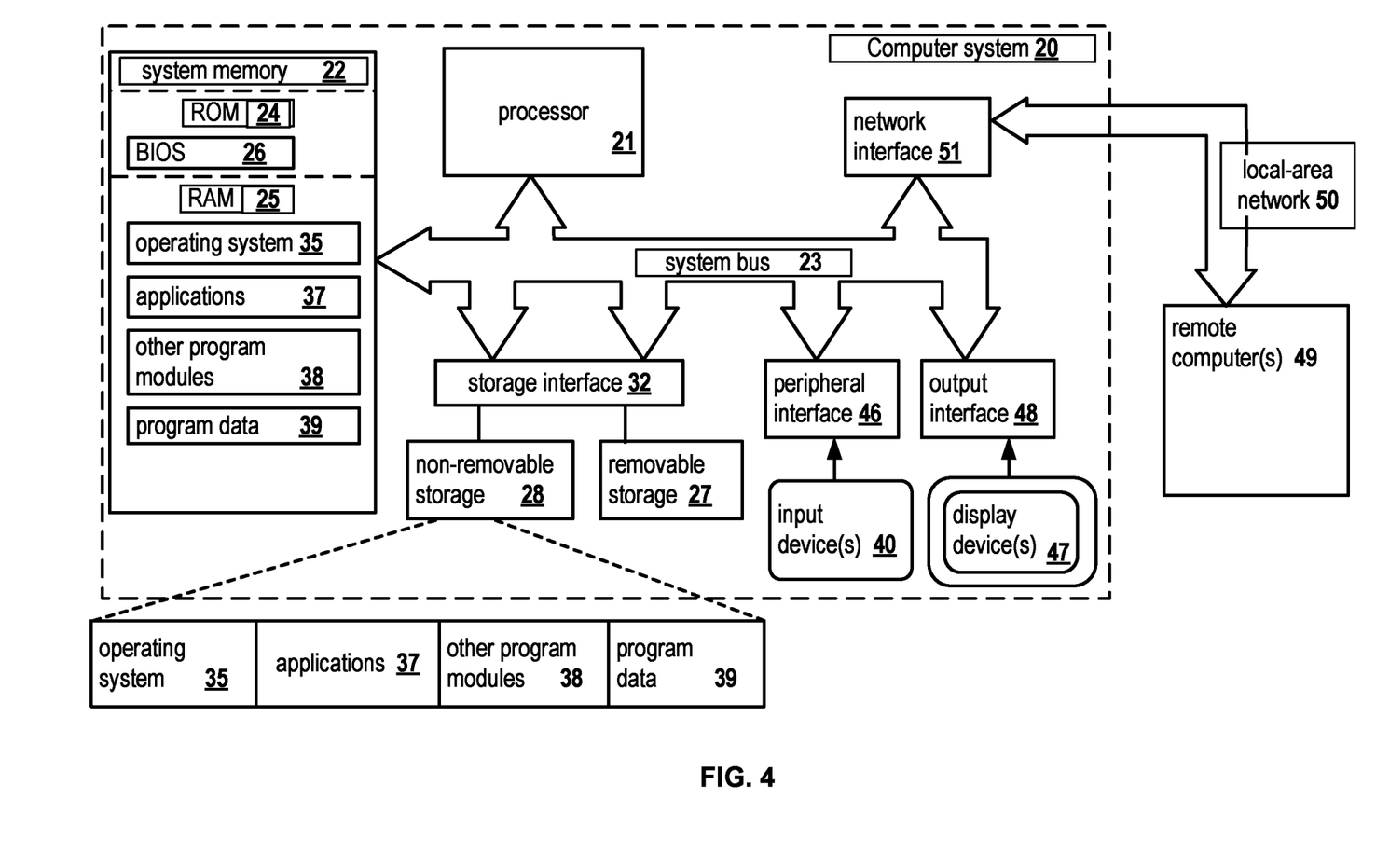
FIG. 4 presents an example of a general-purpose computer system on which aspects of the present disclosure can be implemented.

FIG. 4 is a block diagram illustrating a computer system 20 on which aspects of systems and methods for pattern-based QoS violation prediction may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for pattern-based QoS violation prediction, the method comprising:
    identifying a service on a computing device that is connected to a plurality of client devices;
    determining a plurality of micro-services comprised in the identified service;
    continuously collecting access information for each micro-service of the plurality of micro-services;
    parsing the access information to detect that a first client device is accessing a micro-service of the plurality of micro-services; and
    determining, for a first period of time, QoS evaluation parameters for the access between the micro-service and the first client device based on the parsed access information;
    identifying changes in the QoS evaluation parameters within the first period of time;
    classifying, using a machine learning algorithm, the changes to a predetermined QoS violation pattern, wherein the predetermined QoS violation pattern is associated with a time length until a QoS violation is expected to occur; and
    in response to determining that the time length is within an upcoming second period of time, executing a QoS action that increases the time length until the QoS violation is expected to occur for the access, wherein the second period of time is an expected amount of time until the access between the micro-service and the first client device will manually end.

2. The method of claim 1, wherein executing the QoS action further comprises:
    identifying a key parameter that will cause the QoS violation;
    searching for the key parameter in a QoS actions database; and
    executing the QoS action that corresponds to the key parameter in the QoS actions database.

3. The method of claim 2, wherein the key parameter is an increase in an amount of client devices accessing the micro-service at a same time, wherein the amount of client devices exceeds a threshold amount of allowable client device, and wherein the QoS action is to schedule access to the micro-service such that the client devices can complete access within a third period of time.

4. The method of claim 2, wherein the key parameter is an upcoming system reboot of the computing device during which the micro-service will be unavailable, and wherein the QoS action is to postpone the system reboot and prevent access to the micro-service by other client devices until the system reboot occurs.

5. The method of claim 2, wherein the key parameter is an expected network disconnection or hardware failure, and wherein the QoS action is to move the service to a different computing device.

6. The method of claim 1, wherein the micro-service is one of:
    (1) a write operation,
    (2) a read operation,
    (3) an operation to service a queue,
    (4) a metadata service,
    (5) a replication service,
    (6) a data recovery service,
    (7) a device health tracking service, and
    (8) a behavior analyzing service for storage nodes in a cluster system.

7. The method of claim 1, further comprising identifying the QoS action, wherein the QoS action is linked with the predetermined QoS violation pattern.

8. The method of claim 1, wherein the QoS action is at least one of:
    (1) replacing a hardware/disk drive,
    (2) adding additional storage space,
    (3) increasing channel speed,
    (4) creating additional backup replica of data,
    (5) moving data to another storage node,
    (6) re-scheduling backup operations, and
    (7) balancing a load on storage and server.

9. A system for pattern-based QoS violation prediction, the system comprising:
a hardware processor configured to:
identify a service on a computing device that is connected to a plurality of client devices;
determine a plurality of micro-services comprised in the identified service;
continuously collecting access information for each micro-service of the plurality of micro-services;
parse the access information to detect that a first client device is accessing a micro-service of the plurality of micro-services; and
determine, for a first period of time, QoS evaluation parameters for the access between the micro-service and the first client device based on the parsed access information;
identify changes in the QoS evaluation parameters within the first period of time;
classify, using a machine learning algorithm, the changes to a predetermined QoS violation pattern, wherein the predetermined QoS violation pattern is associated with a time length until a QoS violation is expected to occur; and
in response to determining that the time length is within an upcoming second period of time, execute a QoS action that increases the time length until the QoS violation is expected to occur for the access, wherein the second period of time is an expected amount of time until the access between the micro-service and the first client device will manually end.

10. The system of claim 9, wherein the hardware processor is configured to execute the QoS action by:
identifying a key parameter that will cause the QoS violation;
searching for the key parameter in a QoS actions database; and
executing the QoS action that corresponds to the key parameter in the QoS actions database.

11. The system of claim 10, wherein the key parameter is an increase in an amount of client devices accessing the micro-service at a same time, wherein the amount of client devices exceeds a threshold amount of allowable client device, and wherein the QoS action is to schedule access to the micro-service such that the client devices can complete access within a third period of time.

12. The system of claim 10, wherein the key parameter is an upcoming system reboot of the computing device during which the micro-service will be unavailable, and wherein the QoS action is to postpone the system reboot and prevent access to the micro-service by other client devices until the system reboot occurs.

13. The system of claim 10, wherein the key parameter is an expected network disconnection or hardware failure, and wherein the QoS action is to move the service to a different computing device.

14. The system of claim 9, wherein the micro-service is one of:
(1) a write operation,
(2) a read operation,
(3) an operation to service a queue,
(4) a metadata service,
(5) a replication service,
(6) a data recovery service,
(7) a device health tracking service, and
(8) a behavior analyzing service for storage nodes in a cluster system.

15. The system of claim 9, wherein the hardware processor is configured to identify the QoS action, wherein the QoS action is linked with the predetermined QoS violation pattern.

16. The system of claim 9, wherein the QoS action is at least one of:
(1) replacing a hardware/disk drive,
(2) adding additional storage space,
(3) increasing channel speed,
(4) creating additional backup replica of data,
(5) moving data to another storage node,
(6) re-scheduling backup operations, and
(7) balancing a load on storage and server.

17. A non-transitory computer readable medium storing thereon computer executable instructions for pattern-based QoS violation prediction, including instructions for:
identifying a service on a computing device that is connected to a plurality of client devices;
determining a plurality of micro-services comprised in the identified service;
continuously collecting access information for each micro-service of the plurality of micro-services;
parsing the access information to detect that a first client device is accessing a micro-service of the plurality of micro-services; and
determining, for a first period of time, QoS evaluation parameters for the access between the micro-service and the first client device based on the parsed access information;
identifying changes in the QoS evaluation parameters within the first period of time;
classifying, using a machine learning algorithm, the changes to a predetermined QoS violation pattern, wherein the predetermined QoS violation pattern is associated with a time length until a QoS violation is expected to occur; and
in response to determining that the time length is within an upcoming second period of time, executing a QoS action that increases the time length until the QoS violation is expected to occur for the access, wherein the second period of time is an expected amount of time until the access between the micro-service and the first client device will manually end.

18. The non-transitory computer readable medium of claim 17, wherein instructions for executing the QoS action further comprise instructions for:
identifying a key parameter that will cause the QoS violation;
searching for the key parameter in a QoS actions database; and
executing the QoS action that corresponds to the key parameter in the QoS actions database.

* * * * *